UNITED STATES PATENT OFFICE.

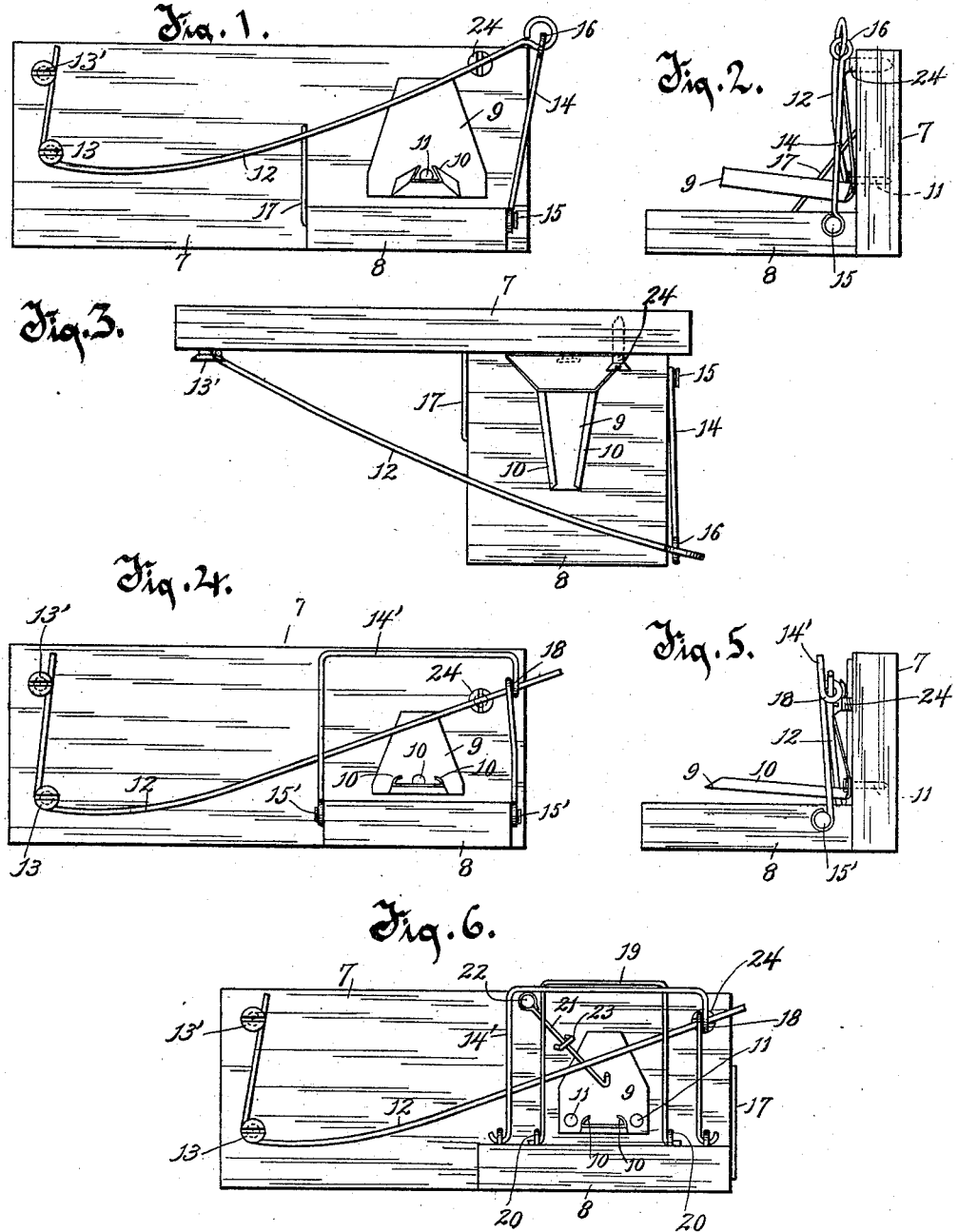

THOMAS CRANE, OF FORT ATKINSON, WISCONSIN, ASSIGNOR OF ONE-HALF TO CHESTER A. CASWELL, OF SAME PLACE.

ANIMAL-TRAP.

SPECIFICATION forming part of Letters Patent No. 566,502, dated August 25, 1896.

Application filed April 14, 1896. Serial No. 587,473. (No model.)

*To all whom it may concern:*

Be it known that I, THOMAS CRANE, of Fort Atkinson, in the county of Jefferson and State of Wisconsin, have invented a new and useful Improvement in Animal-Traps, of which the following is a description, reference being had to the accompanying drawings, which are a part of this specification.

My invention has relation to improvements in animal-traps particularly adapted, although not necessarily, for catching rats and mice.

Among the objects of my invention are—
First. To provide a trap in which no locking or engaging means are required for holding the clamp in set position, said clamp being automatically retained in said set position until the trap is sprung.

Second. To provide a trap in which there is a lateral movement with increased force until the clamp is fully sprung, while, on the other hand, when the clamp is adjusted to a set position said lateral power gradually decreases. The clamp therefore, under the first movement, strikes the animal with the maximum force, while under the second movement, as the lateral power gradually decreases, the clamp is set with but little effort.

Third. A further object contemplated is the provision of an adjustable gage for governing the tension for springing the trap; and fourth, the invention contemplates a simple, cheap, and durable trap adaptable for different sizes of animals.
In the accompanying drawings, Figure 1 is a front elevation of the simplest form of my invention. Fig. 2 is an edge view of Fig. 1. Fig. 3 is a plan view of Fig. 1. Fig. 4 is an elevation of a modified form of the trap.
Fig. 5 is an edge view of Fig. 4; and Fig. 6 is an elevation of another modified form.

Referring to the drawings, the numeral 7 indicates an upright back piece, and 8 a base-piece or platform, projecting from the lower edge of the back piece near one end thereof.

The numeral 9 indicates a tripping device, which is also adapted to hold the bait. This trip is preferably of angular form, one arm thereof being provided with upturned edges or flanges 10 10, in order to hold and confine the bait thereon. The end of the other member or arm of this trip is advisably bent or deflected, in order to more effectually spring the trap. This tripping device is pivoted to the back piece upon one or more pivot-pins 11.

The spring for springing the clamp is indicated by the numeral 12. This spring is hinged at one end to the back piece 7, the hinged joint being advisably formed by two screws or equivalents 13 13'. The spring is wound around the screw 13, and its end then extended upwardly, so that its extremity bears against the screw 13'.

The parts above described are common to all the figures of the drawings. Referring now particularly to Figs. 1, 2, and 3, the clamp is formed by a link 14 in connection with the spring 12. This link, when the clamp is down, extends longitudinally of the base-piece, and is pivoted at its inner end to said base-piece upon the pivot-pin 15. The outer end of the link is pivotally connected to the end of the spring 12 adjacent, as indicated at 16. If desired, the base-piece can be more securely held to the back piece by means of a brace 17, Figs. 1, 2, and 3. In Fig. 3 the link and spring are shown as sprung, that is, adjusted to a horizontal position. If, now, it is desired to set the trap for use, a bait is first placed upon the horizontal arm or member of the trip. The spring and link are now raised to the position illustrated in Figs. 1 and 2, conveniently by grasping the projecting end of the spring at the pivotal joint 16. In thus raising the spring and link the lateral pressure of the link on the end of the spring gradually decreases as the link assumes an upright position. Just before these parts reach this upright position the spring engages the bent or deflected end of one member of the trip and presses this member back against the back piece 7, at the same time raising the other member of the trip, which carries the bait above the base-piece 8, as clearly shown in Fig. 2. The pivot-pin 15 and the screws 13 13', which latter form the pivot or hinge for one end of the spring 12, are in approximate longitudinal alinement.

It will, however, be noticed that the pivotal point 16, (see Fig. 2,) when the link and spring are thus adjusted to a set position, is out of alinement with the pivot-point 15, being thrown slightly to the rear thereof. This, it is apparent, will have the effect of automatically holding the spring and link in set position. The moment a rat or mouse steps on the member of the trip which carries the bait the weight of said rat or mouse will have the effect of turning the trip on its pivot and causing the member thereof which bears against the spring to be thrown forward. The force thus exerted against the spring will move the spring and link forward, and the moment the pivot-point 16 is brought in front of the pivot-point 15 the link and spring will descend with great force, the power of the lateral movement increasing until the clamp is finally brought to rest on the base-piece.

In Figs. 4 and 5, instead of employing merely a link, a device is substituted therefor, which is advisably in the form of a bail 14', with its inner ends pivotally connected upon the pins 15' 15', extending from the base-piece. That side of the bail which would correspond to the link 14 is provided with a coil 18, through which coil the end of the spring 12 projects, forming a pivot connection between the bail and spring. This modified form of construction in its operation is similar in all respects to the form shown in Figs. 1, 2, and 3. By making the clamp in the form of a bail or rectangle a stronger and more effective clamping device is obtained.

In Fig. 6 I show a construction more especially adapted for catching both rats and mice. In this form an extra clamp 19 is shown, pivoted at the points 20 20. This double form of clamp will have the effect of more securely holding the animal. I also show an extra trip 21, which is adapted to swing forward on the pin 22. This trip passes through a guide-bail 23, and may have its free end bent or hooked to engage the bait. The rat or mouse mounts upon the horizontal member of the trip 9 and pulls at the bait on the hooked or bent end of the trip 21. The spring, under such circumstances, has the pressure of both the trip 21 and the trip 9 thereagainst, whereby the power of spring in the trap is increased.

In all the forms of the device illustrated on the accompanying drawings is shown a set-screw 24, which extends from the back piece 7, and the head thereof is adapted to engage the spring 12 when the trap is set. This set-screw forms an adjustable gage for governing the tension for springing the trap. It is obvious that the farther the set-screw is screwed inwardly into the back piece the more difficult it will be for the clamp to be sprung, inasmuch as the pivot-point 16 is brought farther back of the line of the pivot 15.

While I have herein shown and described the clamp as being pivoted to the base-piece, the spring as pivoted to the back piece, and the trip as also pivoted to said back piece, yet I do not wish to be understood as limiting myself to that precise construction, inasmuch as it is apparent that the same result can be obtained by an obvious modification of this arrangement, which would consist in pivoting the spring and trip to the base-piece and allowing the spring and clamp to spring upward, instead of downward, as illustrated. I also do not wish to be understood as limiting myself in other particulars to the specific details of construction herein shown and described, as the broad feature of my invention resides in an animal trap having an attached spring pivotally engaging at one end a pivoted clamp, said clamp when being adjusted to a set position adapted to be thrown out of line with its pivotal point, in connection with a tripping device adapted to act against the spring or the clamp to throw the clamp out of set position.

What I claim as my invention is—

1. In an animal-trap, the combination, of a base-piece, an attached spring, a clamp hinged at one end, and connected at its opposite end to the spring, said clamp, when turned to a set position, adapted to be thrown out of alinement with its hinged or pivoted joint, whereby it is automatically held to a set position, and a trip for springing the clamp, substantially as described.

2. In an animal-trap, the combination, of a frame comprising two parts, a spring attached to one of said parts, a clamp hinged at one end to one of said parts, and connected at its opposite end to the spring, said clamp, when turned to a set position, adapted to be thrown out of alinement with its hinged or pivoted joint, whereby it is automatically held to a set position, and a trip for springing the clamp.

3. In an animal-trap, the combination, of a frame comprising two parts, a spring attached to one of said parts, a clamp hinged at one end to one of said parts, and connected at its opposite end to the spring, said clamp, when turned to a set position, adapted to be thrown out of alinement with its hinge or pivotal joint, whereby it is automatically held to a set position, a trip for springing the clamp, and an adjustable gage adapted to limit the extent to which the clamp can be thrown beyond its pivotal point.

4. In an animal-trap, the combination, of a frame comprising two parts, a spring attached to one of said parts, a link hinged at one end to one of said parts, and connected at its opposite end to the spring, the link, in conjunction with the spring, forming a clamp, and said clamp, when turned to a set position, adapted to be thrown out of alinement with its hinge or pivotal joint, whereby it is automatically held to a set position, and a trip for springing the clamp.

5. In an animal-trap, the combination, of a frame comprising two parts, a spring attached to one of said parts, a link hinged to one of the parts, and connected to the spring, said link being extended into a bail to form a clamp, said clamp, when turned to a set position, adapted to be thrown out of alinement with its hinge or pivotal joint, whereby it is automatically held to a set position, and a trip for springing the clamp.

In testimony whereof I affix my signature in presence of two witnesses.

THOMAS CRANE.

Witnesses:
TED B. ROYCE,
C. A. CASWELL.